United States Patent [19]

Poloni

[11] Patent Number: 4,977,806
[45] Date of Patent: Dec. 18, 1990

[54] PLANT TO CROP HEAD AND TAIL AND TO TAKE SAMPLES

[75] Inventor: Alfredo Poloni, Ronchi Dei Legionari, Italy

[73] Assignee: Danieli & C. Officine Meccaniche SpA, Buttrio, Italy

[21] Appl. No.: 434,999

[22] Filed: Nov. 13, 1989

Related U.S. Application Data

[63] Continuation of Ser. No. 210,988, Jun. 24, 1988, abandoned.

[30] Foreign Application Priority Data

Jul. 13, 1987 [IT] Italy ................... 83404 A/87

[51] Int. Cl.⁵ ............................................. B23D 25/12
[52] U.S. Cl. ................................... 83/105; 83/167; 83/288; 83/303; 83/306; 83/322
[58] Field of Search .............. 83/105, 106, 288, 303, 83/306, 322, 170, 345, 167

[56] References Cited

U.S. PATENT DOCUMENTS

| | | | |
|---|---|---|---|
| 3,109,340 | 11/1963 | Kinnicutt et al. | 83/105 |
| 3,258,951 | 7/1966 | Kinnicutt et al. | 83/105 |
| 3,688,621 | 9/1972 | Randich. | |
| 3,834,260 | 9/1974 | Sieurin et al. | 83/106 |
| 4,176,535 | 12/1979 | Elsner et al. | 83/105 X |
| 4,392,399 | 7/1983 | Wyzgol et al. | 83/106 |

FOREIGN PATENT DOCUMENTS

| | | |
|---|---|---|
| 152122 | 8/1985 | European Pat. Off. . |
| 481603 | 8/1929 | Fed. Rep. of Germany . |
| 804056 | 4/1951 | Fed. Rep. of Germany . |
| 2145020 | 3/1973 | Fed. Rep. of Germany . |
| 2720136 | 11/1978 | Fed. Rep. of Germany . |
| 666433 | 10/1929 | France . |
| 1578587 | 8/1969 | France . |
| 83397A87 | 6/1987 | Italy . |
| 83398A87 | 6/1987 | Italy . |
| 2075899 | 11/1981 | United Kingdom . |

Primary Examiner—Frank T. Yost
Assistant Examiner—Rinaldi Rada
Attorney, Agent, or Firm—Wegner, Cantor, Mueller & Player

[57] ABSTRACT

Plant to perform cropping and to take samples, which is suitable to crop the head and tail of a rolled product which may travel at high or very high speeds, the head and tail being discharged through an independent discharge conduit (15), the plant comprising at least one flying shears (11) at least for the shearing and correct delivery of the head and tail, the discharge conduit (15) cooperating with a flying shears (18) to take samples, at least one container (19) for the portions collected as samples being located downstream of the sampling flying shears (18).

5 Claims, 1 Drawing Sheet

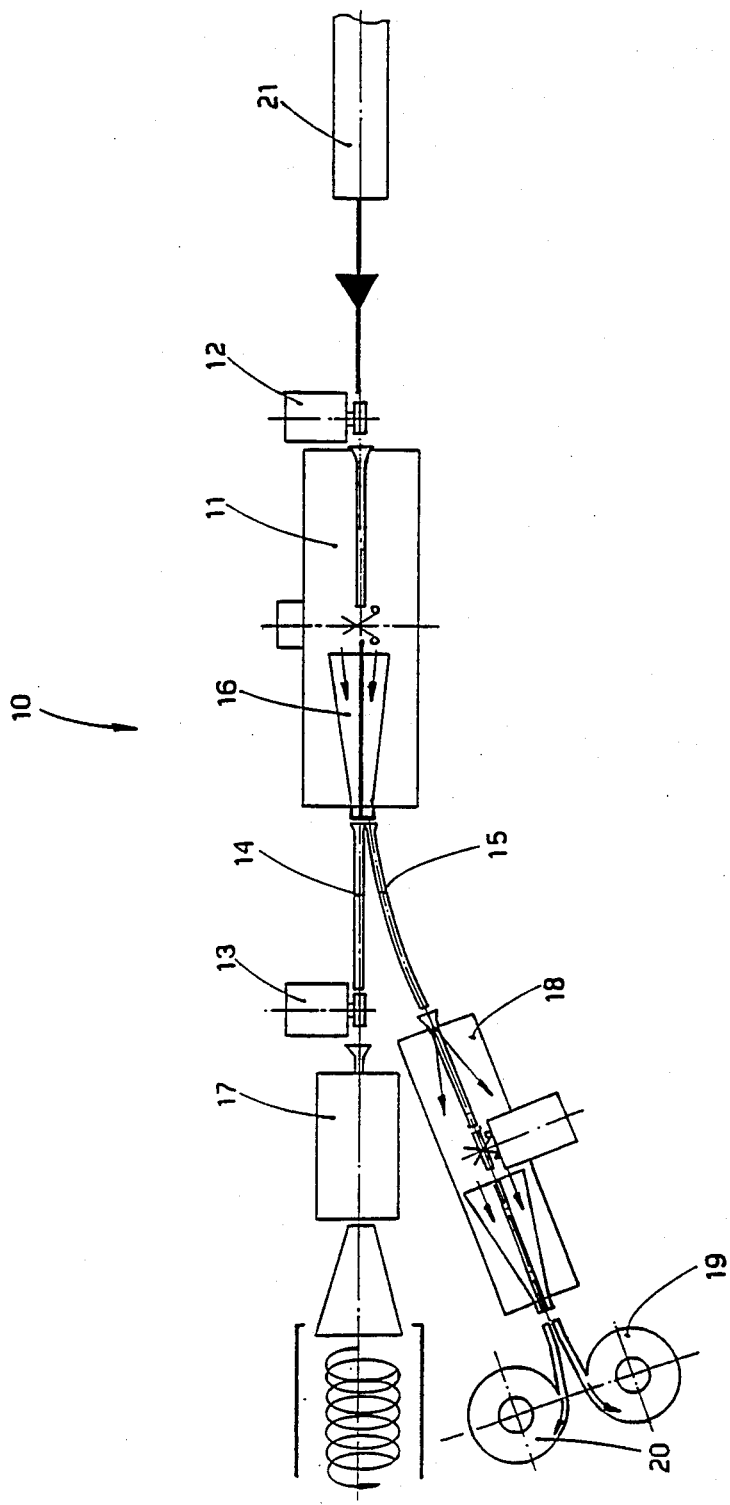

PLANT TO CROP HEAD AND TAIL AND TO TAKE SAMPLES

This application is a continuation of U.S. application Ser. No. 210,988 filed June 24, 1988 now abandoned.

BACKGROUND OF THE INVENTION

This invention concerns a cropping plant able to perform the separation of the head and tail portions from a rolled body and to obtain pieces for use as samples.

To be more exact, this invention concerns a cropping plant having the additional purpose of obtaining samples, the plant being suitable to process rolled stock travelling even at high and very high speeds.

By high and very high speeds are meant speeds up to about 100-120 meters per second, for instance, in the case of rods with diameters of 4 to 8 mm.

Cropping plants are known which employ high and very high speed shears.

Cropping plants which include very high speed shears are also known from patent applications Nos. IT 83397 A/87 and IT 83398 A/87 in the name of the present applicant.

These cropping plants employ very high speed shears able to shear the head and tail of a rolled product while travelling and, at the same time, to ensure the correct placing of the rolled product in the required discharge conduits.

No cropping plant is known which is also able to take samples of the product travelling at speed, especially where the rolled stock is travelling at a high or very high speed.

SUMMARY OF THE INVENTION

According to the invention a cropping plant operating advantageously, but not essentially, at a high or very high speed and employing, for instance, shears of the type described in patent applications IT 83397 A/87 and IT 83398 A/87 comprises, on its conduit to discharge head and tail portions, a further flying shears having the twofold task of obtaining sample pieces by cropping the head and tail and possibly of shearing the remaining head and tail portions into pieces.

A very high speed flying shears is known which is suitable to shear rolled stock travelling even faster than 100-120 meters per second and having diameters of 4 to 8 mm., this shears comprising two knives with blades able to contrarotate at a pre-set speed at least in the transient period of shearing.

Such flying shears is equipped with a guide which is able to move laterally at a pre-set speed and to position itself at a determined position in relation to the circumferential position of the blades.

Downstream of the knives of such flying shears is an internal partition located in a conveyor channel; in the shears the speed of lateral movement of the guide and the speed of rotation of the knives are correlated and the lateral position of the guide and the circumferential position of the blades of the knives are strictly interdependent.

The partition in such flying shears has its initial portion formed with a rounded ridge lying on a plane located higher than the horizontal plane containing the shearing axis by a value correlated to the diameter of the rolled stock.

A shears of this type is shown in IT 83398 A/87 and can be employed to shear the head and tail of the rolled stock where the invention is applied to rolled stock travelling at high or very high speeds.

A further flying shears is fitted on the discharge conduit of a flying shears of the type described above, for instance. This further flying shears too may be of the type described above.

This second flying shears has the purpose of shearing the terminal portion of the sheared head and the initial portion of the sheared tail and of sending such terminal portion of the sheared head and such initial portion of the sheared tail into a sampling container. The remaining crop ends may be sheared into pieces as scrap or discharged to a zone for scrap.

This invention is therefore embodied with a plant to crop head and tail and to obtain samples.

Let us now see with the help of the attached figure, which is given as a non-restrictive example, a preferred embodiment of the invention.

BRIEF DESCRIPTION OF THE DRAWING

The one single FIGURE shows a traditional plant characterized according to the invention and comprising a further flying shears for sampling purposes on the discharge conduit.

DESCRIPTION OF PREFERRED EMBODIMENT

A cropping plant 10 with a sampling capability is provided downstream of an intake conveyor 21.

The cropping plant 10 with the sampling capability comprises a first flying shears 11 with a channel 14 connecting a receiver funnel 16 to a coiling machine 17 and a discharge conduit 15 connecting the funnel 16 to a second sampling shears 18.

The first flying shears 11, which for instance may be of the type shown in IT 83398 A/87, U.S. Ser. No. 209,055 has an intake drawing unit 12 positioned upstream and an outlet drawing unit 13 located downstream.

The first flying shears 11 serves to connect the intake conveyor 21 to the coiling machine 17 after having sheared the head and tail from rolled stock passing through. The head and tail are discharged through the discharge conduit 15.

A second flying shears 18 is included downstream of the discharge conduit 15 and serves to shear the terminal portion of the sheared head and/or the initial portion of the sheared tail, thereafter sending such terminal portion and/or initial portion to a sampling container 19, while the remaining portions of the sheared head and tail are discharged or sheared into pieces and delivered to a container 20 for scrap.

If so required, any portion of the sheared head and/or tail may be taken as a sample even though the portions indicated above are deemed better.

If the first flying shears 11 shears to size the rolled stock after removal of the head and tail, the plant may also be employed to take samples of intermediate portions.

The second flying shears 18 obtaining the samples may be of a traditional type or of the type described in IT 83398 A/87 or IT 83397 A/87.

I claim:

1. Plant for cropping and sampling a rolled product, and for processing the rolled product at high or very high speeds, comprising: at least one first flying shears for shearing the head and tail from rolled product passing through and for correctly delivering the sheared head and tail; a discharge conduit receiving the sheared head and tail delivered from said first flying shears; a second flying shears downstream of said discharge conduit for shearing the terminal portion of the sheared head or the initial portion of the sheared tail to form sample portions of the sheared terminal or initial portion and remaining portions of the sheared head or tail, and for separately discharging said sample portions and said remaining portions; and at least one sample-portions container for collecting only the sample portions separately discharged from the second flying shears.

2. Plant as claimed in claim 1, wherein the sample portions are terminal portion of the sheared head and the initial portion of the sheared tail.

3. Plant as claimed in claim 1, wherein said second flying shears can also shear intermediate portions of the head and/or tail to form the sample portions.

4. Plant as claimed in claim 1, further comprising a channel downstream of said first flying shears for receiving the rolled product, and a coiling machine downstream of said channel.

5. Plant as claimed in claim 1, further comprising a scrap container for collecting only said remaining portions separately discharged from the second flying shears.

* * * * *